(12) United States Patent
Healy

(10) Patent No.: US 12,116,109 B2
(45) Date of Patent: Oct. 15, 2024

(54) AERODYNAMIC CONTROL SURFACE

(71) Applicant: AIRBUS OPERATIONS LIMITED, Bristol (GB)

(72) Inventor: Daren Healy, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 17/993,176

(22) Filed: Nov. 23, 2022

(65) Prior Publication Data

US 2023/0166831 A1 Jun. 1, 2023

(30) Foreign Application Priority Data

Nov. 26, 2021 (GB) ...................... 2117116

(51) Int. Cl.
*B64C 13/38* (2006.01)
*B64C 1/00* (2006.01)
(Continued)

(52) U.S. Cl.
CPC ............ *B64C 13/38* (2013.01); *B64C 1/0009* (2013.01); *B64C 9/10* (2013.01); *B64C 21/08* (2013.01)

(58) Field of Classification Search
CPC ......... B64C 13/38; B64C 1/0009; B64C 9/10; B64C 21/08; B64C 9/32; B64C 9/323;
(Continued)

(56) References Cited

U.S. PATENT DOCUMENTS 2,164,531 A 7/1939 Lee
2,383,102 A 8/1945 Zap
(Continued)

FOREIGN PATENT DOCUMENTS

BE 393126 1/1933
DE 642353 3/1937
(Continued)

OTHER PUBLICATIONS

Momoh et al. (Year: 2009).*
(Continued)

*Primary Examiner* — Valentina Xavier
(74) *Attorney, Agent, or Firm* — Nixon & Vanderhye P.C.

(57) ABSTRACT

An aerodynamic control surface assembly includes a structure (2) with an aerodynamic surface (8) and a curved aerodynamic control surface (20) configured to move between an extended (24) and a retracted position (22). The aerodynamic control surface is arranged to deploy through an aperture (18) in the aerodynamic surface and into an oncoming airflow (A). An actuation mechanism (52, 152, 252) coupled to the aerodynamic control surface (20) moves the aerodynamic control surface (20) between extended and retracted positions. The actuation mechanism (52, 152, 252) is configured such that the control surface (20) follows a curved kinematic path (40, 140, 240) as the control surface moves between the extended (24) and retracted positions (22). The actuation mechanism (52, 152, 252) remains fully behind the aerodynamic surface (8) throughout the movement of the aerodynamic control surface (20) between the extended (24) and retracted positions (22).

19 Claims, 10 Drawing Sheets

(51) Int. Cl.
*B64C 9/10* (2006.01)
*B64C 21/08* (2023.01)

(58) Field of Classification Search
CPC .. B64C 9/00; B64C 9/34; B64C 9/326; B64C 9/36; B64C 13/26; B64C 13/28
See application file for complete search history.

(56) References Cited

U.S. PATENT DOCUMENTS

| | | | | |
|---|---|---|---|---|
| 2,549,044 | A | * | 4/1951 | Ashkenas ............... B64C 9/32 244/90 A |
| 2,730,313 | A | * | 1/1956 | Ringham ............... B64C 23/00 244/213 |
| 2,750,132 | A | * | 6/1956 | Palmer ................... B64C 13/00 244/221 |
| 4,003,533 | A | | 1/1977 | Carter et al. |
| 4,032,087 | A | | 6/1977 | Cleaves |
| 2021/0024198 | A1 | * | 1/2021 | Lorenz ..................... B64C 9/02 |

FOREIGN PATENT DOCUMENTS

| | | |
|---|---|---|
| DE | 1 008 122 | 5/1957 |
| FR | 1.244.351 | 9/1960 |
| GB | 404269 | 1/1934 |
| GB | 574860 | 1/1946 |
| GB | 1 523 963 | 9/1978 |
| GB | 2554882 | 4/2018 |
| WO | 2005/082249 | 9/2005 |
| WO | 2021/122587 | 6/2021 |

OTHER PUBLICATIONS

New et al. (Year: 2013).*
Michael Greiner et al., "Dilemma Resolved: Airbrakes Tamed", Institute of Aerodynamics and Gas Dynamics, vol. 42, No. 4, Technical Soaring, Oct.-Dec. 2018, 8 pages.
Combined Search and Examination Report for GB2117116.0, dated May 20, 2022, 3 pages.
Combined Search and Examination Report for GB2117116.0, dated May 20, 2022, 4 pages.
Search Report for GB2117116.0, dated May 19, 2022, 2 pages.
Horten Ho IX V2, Aircraft of WWII, WW2Aircraft.net Forums, dated Jan. 2007, 21 pages.
De Havilland Mosquito, The Aviation History Online Museum, dated Oct. 2013, 4 pages.
BAe 146 air brake photograph, dated May 2010, 1 page.
Sepecat Jaguar Air brake by 1981, photograph, 1 page.
Bristol 188 Airbrake photograph, dated Nov. 2010, 2 pages.
BAC 211 experimental plane about 1964, photograph, 1 page.
Dornier Do-217, before 1948, Photographs, 1 page.
Dive Brakes on a Vultee Vengeance photograph, Reddit, r/WWIIPlanes, before 1948.
Horten H IX, EXO Crusier website, Oct. 2011, 34 pages.
Horten IX_v2_Go 299, before 1948 1 page.
English Electric Canberra, Wikipedia, downloaded Nov. 2022, 2 pages.
Illustration showing English Electric Canberra Airbrake Channels pre-1951, 1 page.
Schempp-Hirth Spoilers, www.topmodel.fr, Jan. 2004, 7 pages.

* cited by examiner

AERODYNAMIC CONTROL SURFACE

RELATED APPLICATION

This application incorporates by reference and claims priority to United Kingdom patent application GB 2117116.0, filed Nov. 26, 2021.

FIELD OF THE INVENTION

The present invention relates to an aerodynamic control surface assembly, an aircraft including the aerodynamic control surface assembly, and a method of controlling air flow over a structure with an aerodynamic surface.

BACKGROUND OF THE INVENTION

Lift spoiling and drag devices are typically used to disrupt airflow around aerodynamic bodies. The devices are designed to be actuated to deploy into the airflow over the aerodynamic surface to disrupt the oncoming airflow over that surface. The devices may retract either to form part of the aerodynamic profile of the structure or inside that structure behind the aerodynamic surface.

Lift spoiling and drag devices may be generally termed as flow control devices and have a control surface, i.e., the aerodynamic surface of the flow control device that is primarily acting to alter the airflow. There are a wide variety of such known flow control devices, including spoilers, lift dumpers, air brakes (also known as speed brakes or dive brakes). Generally, lift spoiling devices reduce the lift-to-drag ratio and require a higher angle of attack to maintain lift, whereas drag devices are designed to increase drag with little change to lift. Sometimes the function of these lift spoiling or drag devices may be combined with the function of other flow control devices, e.g., on an aircraft a spoileron acts as both a spoiler and an aileron for roll control.

These flow control devices are actuated and deployed by a variety of means, including linkages, linear and rotary mechanisms, and the like. Depending on the kinematic of the deployment some of these mechanisms may be complex and may be cumbersome and occupy a large volume of space within the structure. The aperture or opening through which the control surface deploys, or the void created in the aerodynamic surface of the structure when the control surface deploys, may be large. In some circumstances it is desirable to reduce the size of this aperture and to make the control surface deployment mechanism small in order to enhance the aerodynamic performance of the aerodynamic body when the control surface is retracted, deployed or both.

SUMMARY

According to an aspect of the invention, there is provided an aerodynamic control surface assembly comprising a structure with an aerodynamic surface, a curved aerodynamic control surface configured to move between an extended and a retracted position, an actuation mechanism coupled to the aerodynamic control surface and configured to move the aerodynamic control surface between the extended and retracted positions, wherein the aerodynamic control surface is arranged to deploy through an aperture in the aerodynamic surface and into an oncoming airflow over the aerodynamic surface when in the extended position and is arranged to retract out of the airflow when in the retracted position, wherein the actuation mechanism is configured such that the control surface follows a curved kinematic path as the control surface moves between the extended and retracted positions, and wherein the actuation mechanism remains fully behind the aerodynamic surface throughout the movement of the aerodynamic control surface between the extended and retracted positions.

An aerodynamic control surface is a device which controls the direction of air flow over the structure with an aerodynamic surface.

The actuation mechanism does not extend into an oncoming airflow over the aerodynamic surface. The actuation mechanism does not disrupt the airflow over the aerodynamic surface of the structure.

The curved kinematic path may have variable radii along the path length.

The curved kinematic path can be optimised to maximise the disruption to the oncoming airflow over the aerodynamic surface of the structure.

The actuation mechanism may comprise a four-bar linkage mechanism.

The motion of the four-bar link mechanism may cause motion of the aerodynamic control surface along the curved kinematic path. The deployment and retraction of the aerodynamic control surface may be effected by reciprocating motion of the four-bar link mechanism. The four-bar link mechanism may occupy a relatively small space within the structure and the lengths of each bar of the four-bar link mechanism may be tuned to achieve a desired curved kinematic path.

The four-bar linkage mechanism may comprises: a grounded link fixed with respect to the structure; a first crank pivotably coupled at one end to the grounded link and pivotably coupled at a second end to a coupling link; a second crank pivotably coupled at one end to the grounded link and pivotably coupled at a second end to the coupling link; wherein the aerodynamic control surface is rigidly fixed with respect to either the coupling link or one of the first and second cranks.

The pivoting movement of the first crank and the second crank provides a reciprocating motion of the coupling link. Rigidly fixed means that the aerodynamic control surface does not rotate with respect to the coupling link.

The coupling link may have an extension which extends away from the pivotal connections of the coupling link towards the grounded link.

The extension of the coupling link may be rigidly fixed with respect to the aerodynamic control surface. The extension may have a proximal end nearest the pivotal connections of the coupling link and a distal end nearest the grounded link.

The aerodynamic control surface may be rigidly fixedly connected to the extension at the distal end of the extension.

The aerodynamic control surface may have a flow surface facing the oncoming airflow which is convex or concave.

The aerodynamic control surface may be formed as a blade.

A blade may be a panel, in particular a thin sheet or plate.

The blade may have a substantially constant thickness or a taper of reducing thickness towards a cantilevered free end of the blade, i.e., further from the attachment to the actuation mechanism.

The profile of the blade may have a curvature which substantially matches the path of variable curvature of the actuation mechanism such that the aperture in the aerodynamic surface has a width substantially the same as the maximum thickness of the blade.

As the blade moves along the kinematic curve path, due to the curved profile of the blade, the aperture only needs to be as wide as the local thickness of the blade along the curved kinematic path followed by the blade during deployment and retraction. (with a toleranced clearance) to pass through. This may be equal to or greater than the maximum blade thickness. This may reduce the size of aperture needed in the structure, which may beneficially avoid disruption to airflow over the aerodynamic surface when the control surface is retracted (i.e., the aerodynamic 'clean' state of the aerodynamic surface).

The aerodynamic control surface may be non-linear in a direction transverse to the oncoming airflow direction.

The non-linear profile of the control surface in the direction transverse to the oncoming airflow may help improve the stiffness of the control surface for a given length, height and weight of the control surface.

The shape of the control surface in the transverse direction may be a corrugation.

The aerodynamic control surface may be rigid.

The aperture in the structure may be tapered towards the aerodynamic surface.

The tapered profile of the aperture through the structure (e.g., through a cover panel having the aerodynamic surface) may allow sufficient clearance with the control surface during deployment along the curved kinematic path, while ensuring the aperture dimension at the aerodynamic surface of the structure is minimised. The local angle of the control surface with the aperture may change during the movement along the kinematic path and so the profile of the aperture through the structure may be tapered to avoid any clash. The aperture can be sized to match the kinematic path of the aerodynamic control surface and reduce any unwanted drag effects caused by larger apertures.

The aerodynamic control surface may further comprise a seal for sealing the aperture.

The seal may sit flush in the aperture to seal the aperture when the aerodynamic control surface is in the retracted position. This may provide a smoother airflow over the aerodynamic surface of the structure.

The actuation mechanism may further comprise an actuator, preferably a rotary or linear actuator.

The flow surface of the aerodynamic control surface may not form part of the aerodynamic surface of the structure.

When the aerodynamic control surface is in the retracted position, airflow over aerodynamic profile of the structure with the aerodynamic surface may have fewer disruptions and surface discontinuities as compared to the airflow over the structure when flow control devices arranged to retract and form part of, or sit continuous with, the aerodynamic surface of the structure.

The aerodynamic control surface assembly may be used in or on a vehicle, such as a car, truck, bus, ship, aircraft or helicopter, or structures which control aerodynamic flow, such as wind turbines or water turbines.

An aircraft assembly may comprise the aerodynamic control surface assembly.

In an aircraft, the aerodynamic control surface may be a spoiler, spoileron, lift dumper, air brake, speed brake or dive brake.

The aerodynamic control surface assembly may be on the fuselage, empennage, tailplanes, or wings.

The structure may be an aircraft wing and the aerodynamic surface may be a surface of the wing.

The aerodynamic control surface may be on an upper and/or lower aerodynamic surface of the wing.

In a further aspect of the invention there is a method of controlling airflow over a structure with an aerodynamic surface using a curved aerodynamic control surface, comprising, actuating an actuation mechanism coupled to the aerodynamic control surface to i) move the aerodynamic control surface through an aperture in the aerodynamic surface into an oncoming airflow over the aerodynamic surface to place the aerodynamic surface in an extended position, and ii) move the aerodynamic control surface through the aperture in the aerodynamic surface into a space behind the aerodynamic surface and out of the airflow to place the aerodynamic surface in a retracted position, wherein the actuation mechanism is configured such that the control surface follows a curved kinematic path as the control surface moves between the extended and retracted positions, and wherein the actuation mechanism remains fully behind the aerodynamic surface throughout the movement of the aerodynamic control surface between the extended and retracted positions.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
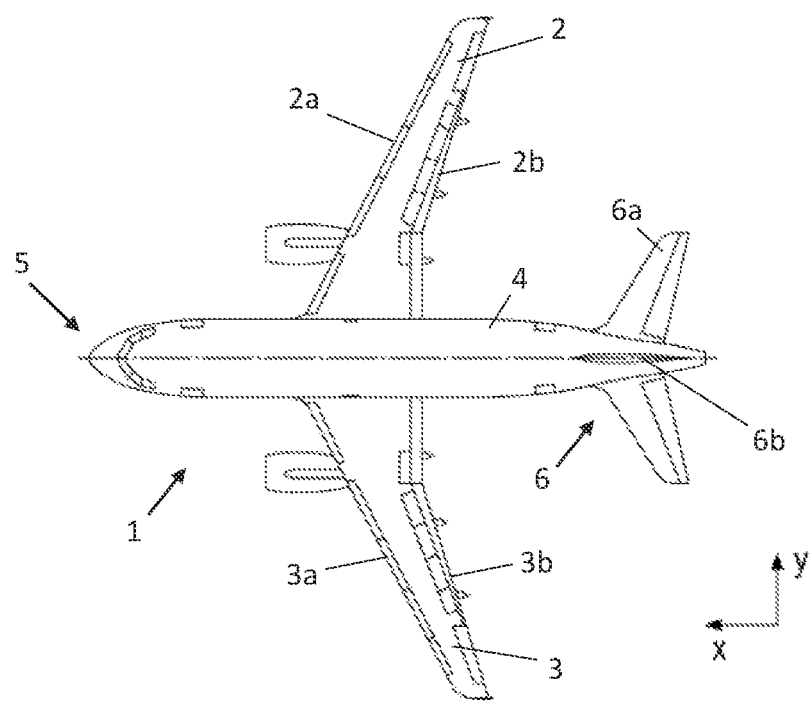
FIG. 1 is a plan view of an aircraft.

FIG. 1 shows an aircraft 1 with port and starboard fixed wings, 2, 3, a fuselage 4 and a nose end 5 and a tail end 6 including horizontal and vertical stabilising surfaces 6a, 6b. Each wing has a leading edge 2a, 3a and trailing edge, 2b, 3b. The aircraft 1 is a typical jet passenger transonic transport aircraft but the invention is applicable to a wide variety of fixed wing aircraft types, including commercial, military, passenger, cargo, jet propeller, general aviation etc. with any number of wings attached to the wings or fuselage. The invention may also be applied to rotary wing aircraft and other aerodynamic bodies such as wind turbine blades, land vehicles, etc.

Figure 2:
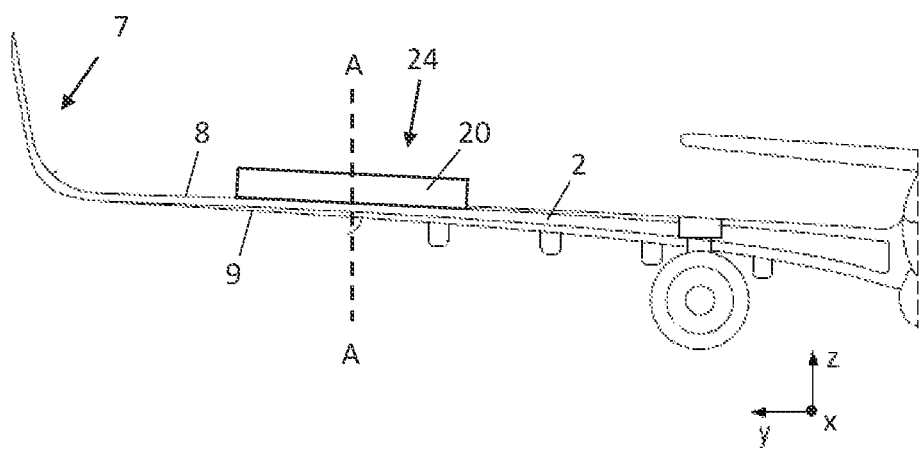
FIG. 2 shows a front view looking aft of the aircraft wing.

The axes shown in FIG. 2 represents the usual reference orthogonal axes of the aircraft 1. The X-axis defines the longitudinal fore-aft direction of the aircraft; the Y-axis defines the spanwise direction and the Z-axis defines the vertical up-down direction of the aircraft.

Each wing 2,3 of the aircraft has a cantilevered structure with a length extending in a spanwise direction from a root to a tip, the root being joined to the aircraft fuselage 4. The wing portion near the root is in the inboard region. The wing portion near the tip is called the outboard region. The wing has an upper aerodynamic surface 8 and the lower aerodynamic surface 9. At the tip end of each wing 2, 3 is a wing tip device 7 outboard of a main portion of the wing.

The wing has an outer aerodynamic surface. The wings 2,3 are aft swept and have a number of aerodynamic flight control surfaces. The flight control surfaces can be adjusted during flight to adjust the aircraft flight attitude or wing performance. There are a number of flight control surfaces, such as ailerons, elevator, rudders, spoilers, flaps, slats and air brakes. These are typically located on the wing 2,3 or on the horizontal stabiliser 6a or vertical stabiliser 6b of the aircraft 1.

The main lift dumping spoilers are typically found on the trailing edge 2b, 3b of the aircraft just forward of the flaps. The aerodynamic control surface 20 shown in FIG. 2 is configured as a lift dump spoiler. The aerodynamic control surface 20 can be moved between a retracted position 22 and a deployed position 24. While the aerodynamic control surface 20 is shown in FIG. 2 to be located outboard of the aircraft wing, near the wing tip device 7, the spoiler 20 may be at any suitable position along the span of the wing 2.

Figure 3:
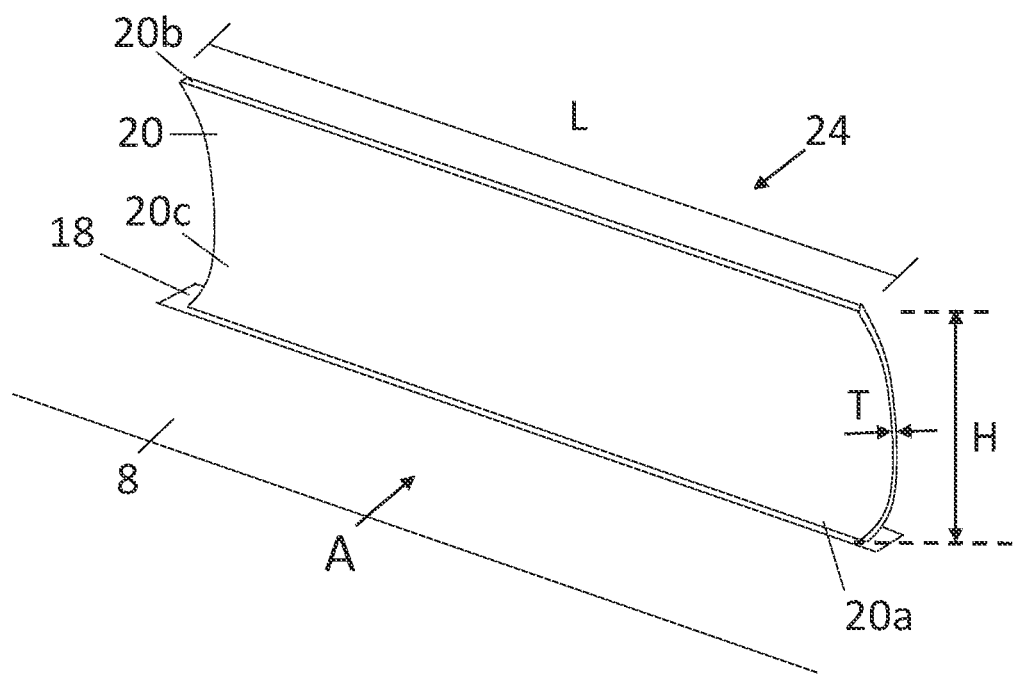
FIG. 3 is a schematic view of a portion of the aircraft wing with an aerodynamic control surface according to an example of the present invention

FIG. 3 shows the aerodynamic control surface 20 arranged on the wing 2, shown schematically in FIG. 3. As shown in FIG. 2, the aerodynamic control surface 20 extends away from the upper surface 8 to disrupt the oncoming airflow A over the wing 2 in the deployed position 24.

As the wings 2, 3 are similar in construction, the wing 3 may have a similar aerodynamic control surface 20 for symmetry with the wing 2. It will be understood that each aerodynamic control surface 20 may be deployed simultaneously or independently.

The aerodynamic control surface 20 has a proximal end 20a and a distal end 20b. The distal end 20b of the aerodynamic control surface 20 extends away from the proximal end 20a towards an aperture 18 in the upper surface 8 of the wing 2. The aerodynamic control surface 20 has a length L and a thickness T. The aerodynamic control surface has a flow surface (facing the oncoming airflow A), 20c and an opposing surface (reverse) 20d. The flow surface 20c may be concave to disrupt the oncoming airflow A, as shown in FIG. 3. Alternatively, the flow surface 20c may be convex (as shown in FIG. 6B). The method of controlling the airflow over the wing 2 using the aerodynamic control surface 20 with one of the exemplary actuation mechanisms 52, 152 and 252, which will be described in greater detail below.

Figure 4A:
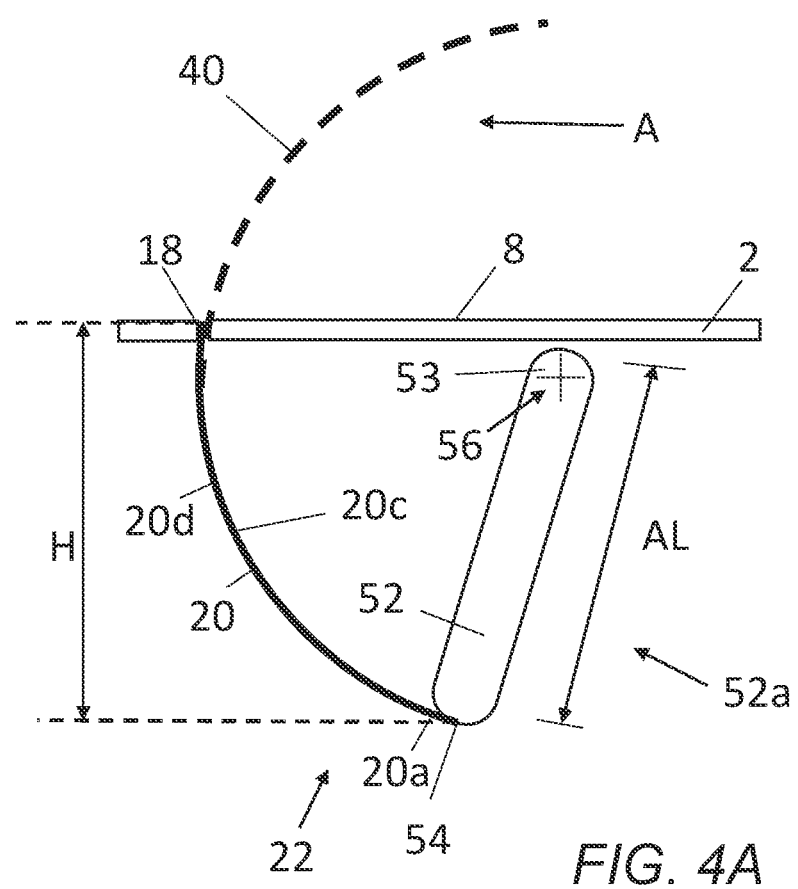
FIGS. 4A to 4C show a cross-sectional view of the aerodynamic control surface and actuating mechanism in the fore-aft direction according to an example of the present invention.
Figure 4B:
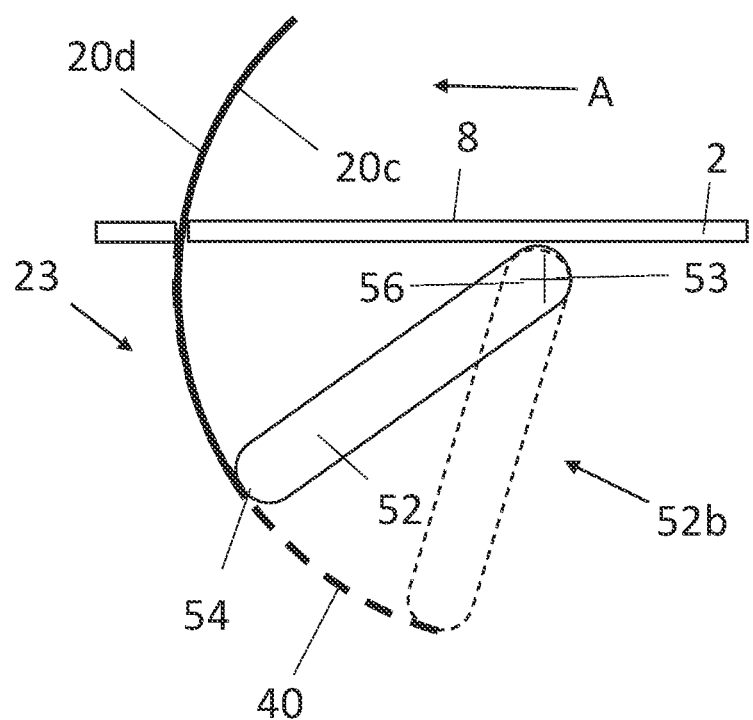
Figure 4C:
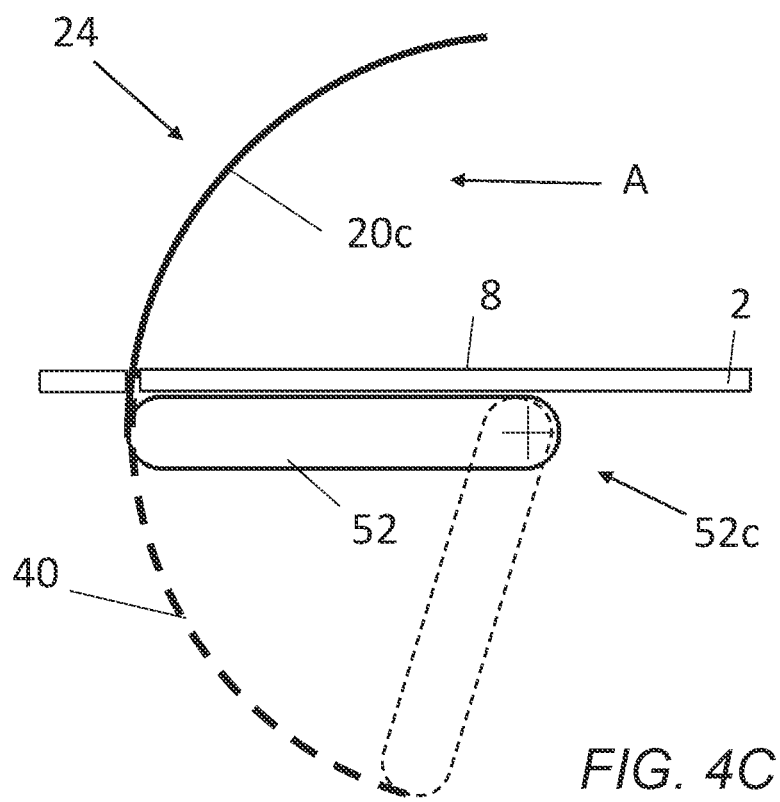

FIGS. 4A to 4C shows a schematic of the cross-section (through A-A of FIG. 2) of an aircraft wing 2 with an aerodynamic control surface 20 in a first example. This example relates to an aerodynamic control surface 20 actuated by actuator mechanism 52. FIG. 4A shows the aerodynamic control surface 20 in a retracted state 22, and FIGS. 4B and 4C show the aerodynamic control surface 20 deploying through intermediate position 23 to a fully extended position 24.

The aerodynamic control surface 20 is in a fully retracted position 22 in an initial or first position 52a of the actuator mechanism as shown in FIG. 4A. In the first position 52a, the aerodynamic control surface 20 does not extend past the upper aerodynamic surface 8 of the wing 2. In a third position 52c, corresponding to the fully deployed state 24, the aerodynamic control surface 20 extends through the aperture 18 in the wing aerodynamic surface 8 into the oncoming airflow moving in direction A. The actuator mechanism 52 is a linear linkage with a length, AL. The actuation mechanism 52 is pivotally connected to the structure of the aircraft wing at a first end 53 of the linear linkage for simple rotation about point 56.

The proximal end 20a of the aerodynamic control surface is rigidly fixed to a second end 54 of the linear linkage of the actuation mechanism 52 opposite the first end 53. That is to say, the proximal end 20a of the aerodynamic control surface 20 does not rotate with respect to the linear linkage but moves with the rotation of the linear linkage about the pivot at 56. The proximal end 20a may be attached by any suitable mechanical means, for example, bolting or welding. The actuation mechanism 52 is operated by an actuator, either directly or indirectly, such as a rotary or linear actuator (not shown) to move the actuation mechanism 52 from the first position 52a to the third position 52c. The actuation mechanism 52 may be deployed from the first position 52a through to 52c or may be deployed from only the first position 52a to the second position 52b. The range of movement of the control surface 20 is shown by the dotted line 40 in FIG. 4A. The actuation of the actuator mechanism 52 may be controlled by a control system of the aircraft 1.

FIG. 4B shows the actuation mechanism 52 in a second position 52b and with the first position 52a in dotted lines. The second position 52b of the actuation mechanism moves the aerodynamic control surface 20 through the aperture 18 in the wing 2. The aerodynamic control surface 20 moves along a curved kinematic path 40 as the actuation mechanism 52 moves from the first position 52a towards the final position 52c. The curved kinematic path 40 indicates the path that the aerodynamic control surface 20 moves from the retracted state 22 to the deployed state 24.

FIG. 4C shows the deployed state 24 of the aerodynamic control surface 20 and the third position 52c of the actuator mechanism 52 and with the first position in dotted lines. In the third position 52c the actuation mechanism 52 has rotated from the first position 52a until the linear linkage is approximately parallel with the aerodynamic surface 8 and the second end 54 of the linear linkage is directly below the aperture 18. The aerodynamic control surface 20 extends through the aperture 18 into the oncoming airflow A. As the actuation mechanism 52 moves from the first position 51a to the third position 52c, the actuation mechanism 52 does not extend through the aperture 18. That is to say, the actuation mechanism 52 remains at all times behind the aerodynamic surface 8 of the wing 2. As the actuation mechanism 52 does not extend through the aperture 18, this naturally limits the extent of deployment of the aerodynamic control surface 20 but means that the size of the aperture 18 is only large enough for the curved control surface 20 to pass through and does not need to accommodate any part of the action mechanism 52, thus minimising the size of the aperture 18.

The curved kinematic path 40 of the spoiler 20 is defined by the length AL of the actuator mechanism 52 as it rotates around the pivot point 56. The curved kinematic is therefore a simple radius about point 56. The curved kinematic path 40 of the spoiler 20 can be tailored by altering the length of the actuator mechanism 52. The proximity of the aerodynamic control surface 20 or the actuation mechanism 52 to the aerodynamic surface 8 can also be altered to tailor the curved kinematic path 40. The curvature of the concave control surface substantially matches the curved kinematic path 40 so that the radius of the curved flow surface 20c is substantially identical to the radius of the kinematic path 40. The control surface 20 may have a substantially constant thickness T along its height H so that the size of the aperture 18 may be minimised. Alternatively, the control surface 20 may have a taper of reducing thickness towards the cantilevered free end of the control surface, furthest from the actuation mechanism. Additionally or alternatively, the control surface 20 may have one or more stiffeners spaced width-wise along the length of the control surface on the reverse surface opposite the flow surface.

In the extended position 24, the flow surface 20c of the aerodynamic control surface 20 faces towards the oncoming airflow A, i.e., is concave. This alters the flow of air over the wing by spoiling the lift and decreases the lift of the local aerofoil section and hence reduces the lift and/or increases the drag generated by the wing 2. The spoiler 20 is retracted back into the wing 2 in the opposite manner i.e., the actuating mechanism 52 moves between the spoiler 20 from a third position 52c back to the first position 52a.

In the example described above with respect to FIGS. 4A-4C, the actuation mechanism 52 is configured as a linear linkage or arm that rotates around a single point 56. FIGS. 5A-5D and 6A-6C shows the schematic views cross-section (through A-A of FIG. 2) of an aircraft wing 2 with a spoiler 20 in a second and third example. These examples relate to an aerodynamic control surface arranged with a four-bar link mechanism actuation system. Similar to FIGS. 4A-4C, FIGS. 5A-5C and 6A-6C show the aerodynamic control surface 20 deploying from a fully retracted position 22 and deploying through intermediate positions 23 to a fully extended position 24 and the second exemplary actuation mechanism 152 and the third exemplary actuation mechanism 252 moving through a first position 152a, 252a to a final position 152c, 252c, respectively.

Figure 5A:
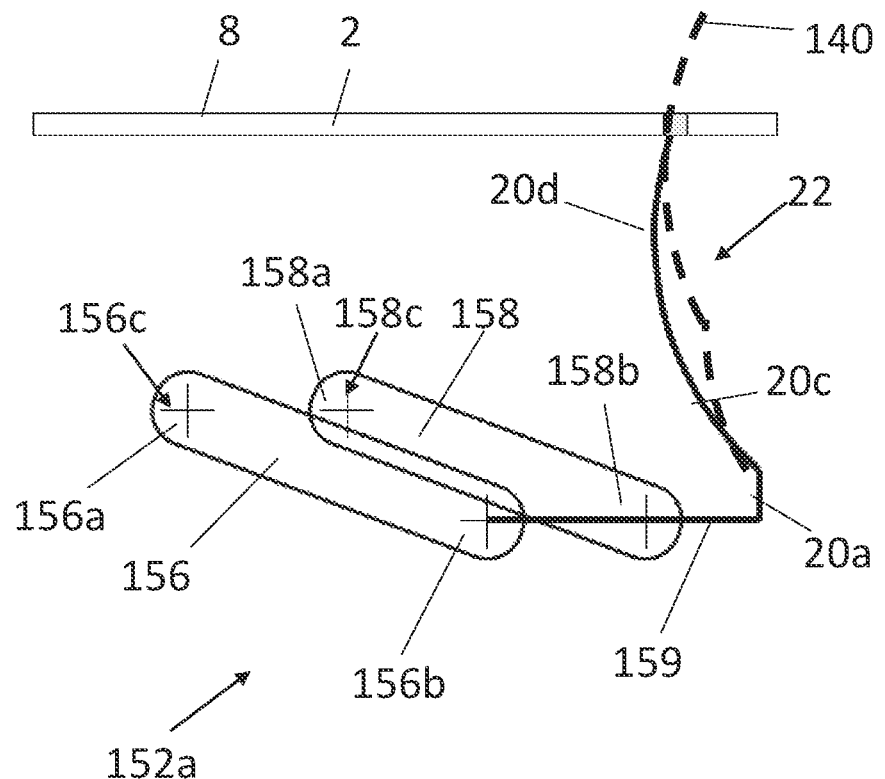
FIGS. 5A to 5D show a cross-sectional view of the aerodynamic control surface and actuating mechanism in the fore-aft direction according to another example of the present invention.

FIG. 5A shows the spoiler 20 in a fully retracted position 22 in the initial position 152a of the horizontal four-bar link mechanism 152. Similar to the example described in FIGS. 4A-4C, the aerodynamic control surface 20 moves from below the aerodynamic upper surface 8 of the wing 2 through the aperture 18 into the oncoming airflow A. The actuation mechanism 152 comprises a four-bar link mechanism with a grounded link 154 which is shown schematically in FIG. 5C but has been omitted from FIGS. 5A and 5B for clarity. The grounded link 154 is secured to or forms part of the wing 2, or another structural element within the wing. The four-bar link mechanism 152 has a first crank 156 with a first end 156a and a second end 156b. The four-bar link mechanism 152 also has a second crank 158 with a first end 158a and a second end 158b. The first end of the first crank 156a is pivotally connected to the grounded link 154 at the connection point 156c. Similarly, the first end of the second crank 158a is pivotally connected to the grounded link 154 at the connection point 158c.

The first crank 156 pivots around the grounded link 154 at the connection point 156c and the second crank 158 pivots around the grounded link 154 at the connection point 158c as the four-bar link mechanism moves from the first position 152a to the deployed position 152c.

The second end 156b of the first crank 156 is pivotably coupled to a coupling link 159. Similarly, the second end 158b of the second crank is pivotably coupled to the coupling link 159 at a point spaced along the coupling link 159 away from the second end 156b of the first crank. The coupling link 159 extends between the second ends 156b, 158b of the first and second crank. The aerodynamic control surface 20 is rigidly fixed to the coupling link 159 at the proximal end of the spoiler 20a, i.e., the control surface 20 does not rotate with respect to the coupling link 159.

As shown in FIG. 5A, the aerodynamic control surface 20 is in a retracted state 22 and the second exemplary actuation mechanism 152 is in the first position 152a. In the first position 152a, the spoiler 20 does not extend beyond the upper surface 8 of the wing 2. As the four-bar link mechanism 152 moves to the deployed position 152c (where the spoiler 20 is in a fully deployed position 24), the first crank 156 and the second crank 158 pivot around the grounded link 154 to extend the aerodynamic control surface 20 through the aperture 18. The movement of the first crank 156 and the second crank 158 moves the coupling link 159 and consequently the spoiler 20 along a complex curved kinematic path 140 (shown in dotted lines in FIG. 5A). The curved kinematic path 140 has a variable radii along the path 140.

Figure 5B:
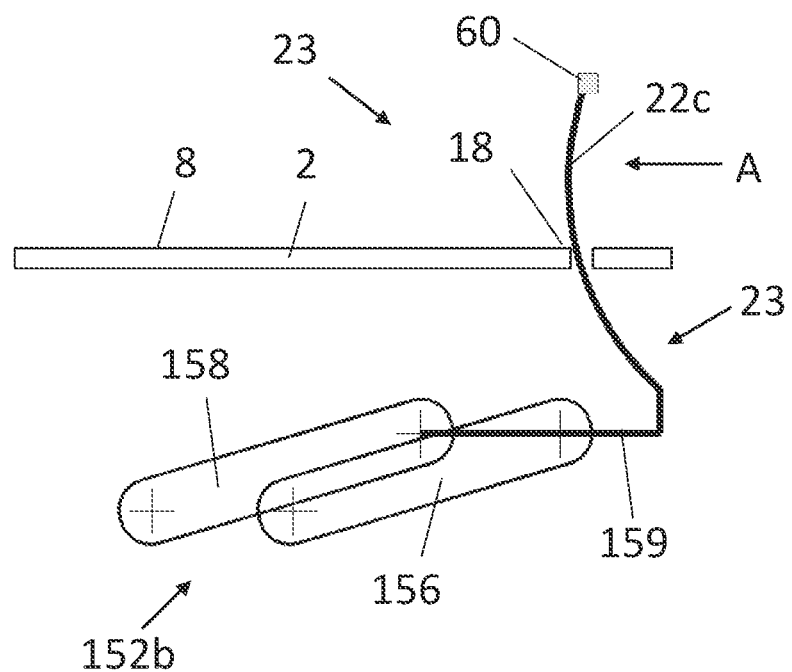
Figure 5C:
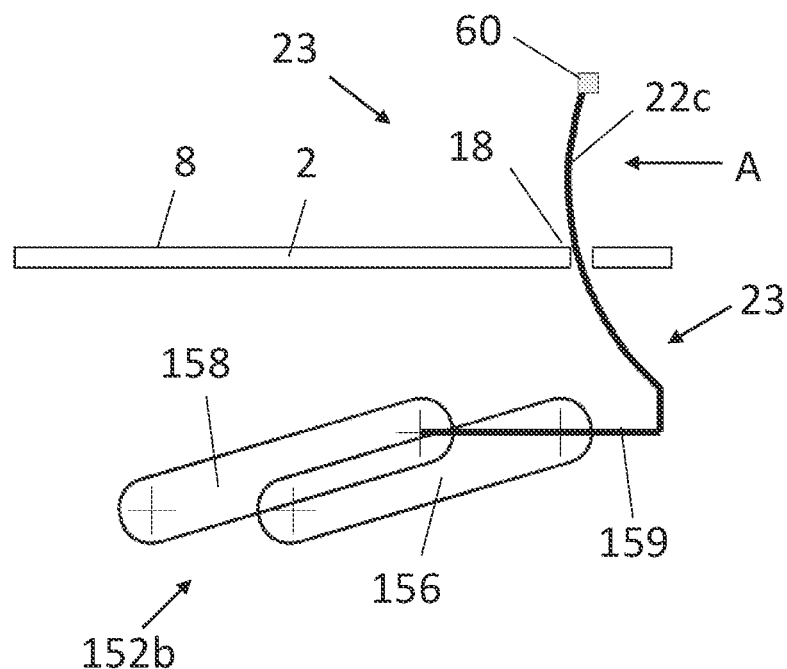
Figure 5D:
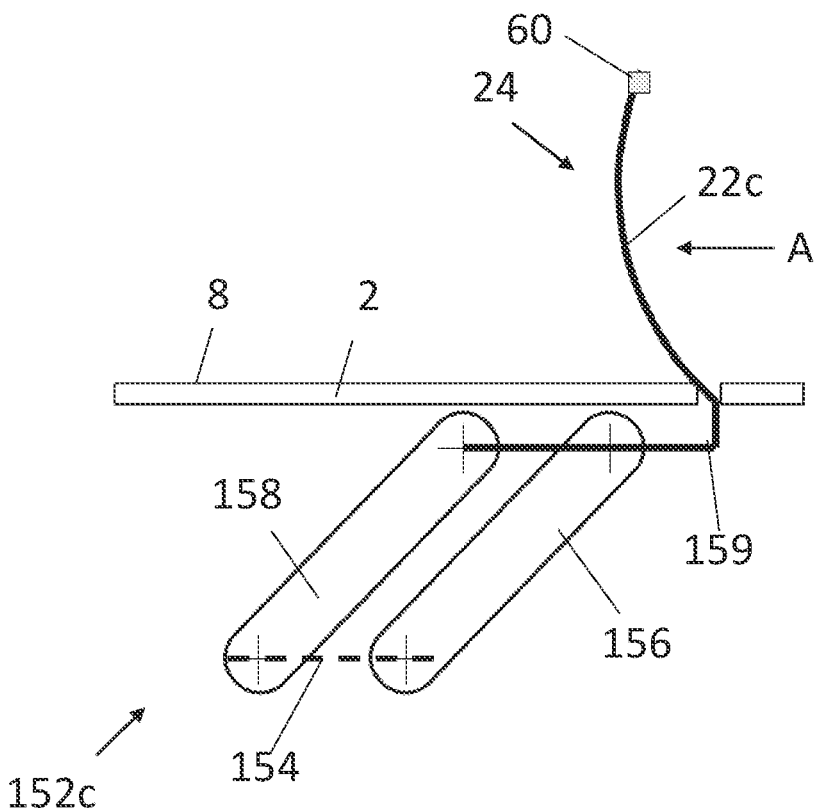

As shown in FIGS. 5B and 5C, the first crank 156 and the second crank 158 are configured to rotate around the grounded link 154 in the same direction until the aerodynamic control surface 20 extends through the aperture 18 and the flow surface 20c is facing into the oncoming airflow direction A.

Alternatively, the aerodynamic control surface 20 may be rigidly secured to the second end 156b of the first crank 156, or the second end 158b of the second crank 158.

FIG. 5C shows the deployed state 24 of the spoiler 20 and the third position 152c of the four-bar link mechanism 152. In the third position 152c, the first crank 156 and the second crank 158 rotate around the ground link 154 until the coupling link 159 is adjacent the reverse face of the wing cover having the aerodynamic surface 8. The aerodynamic control surface 20 extends through the aperture 18 into the oncoming airflow A. As the four-bar link mechanism 152 moves from a first position 152a to the third position 152c, the four-bar link mechanism 152 does not extend through the aperture 18. That is to say, the four-bar link mechanism 152 remains below the upper surface 8 of the wing 2. As the four-bar link mechanism 152 does not extend through the aperture 18, this naturally limits the extent of deployment of the aerodynamic control surface 20 but means that the size of the aperture 18 is only large enough for the curved control surface 20 to pass through and does not need to accommodate any part of the action mechanism 152, thus minimising the size of the aperture 18.

Since the actuation mechanism 152 is a four-bar linkage and not a simple linear linkage (like in the actuation mechanism 52), the kinematic path is not a simple radiused curve but has complex curvature. This means that the control surface 52 can have a profiled curvature in the height direction H which is also not a simple radius but can have a curvature of variable radii along its height dimension. The curvature of the profile of the control surface 20 can be tailored to minimise the size of the aperture 18 for a given kinematic of the actuation mechanism 152. The kinematic of the actuation mechanism 152 can be tailored by adjusting the lengths of the linkages of the four bar linkage mechanism. The proximity of the aerodynamic control surface 20 or the actuation mechanism 152 to the aerodynamic upper surface 8 can also be altered to tailor the complex curved kinematic path 140. This provides a great deal of flexibility to design the shape of the kinematic path and the shape of the flow surface of the control surface to meet various design criteria. These criteria may include a space envelope within the wing 2 for accommodating the actuation mechanism, a particular profile of the curved control surface, a desired drag or lift spoiling characteristic of the control surface, etc.

Figure 6A:
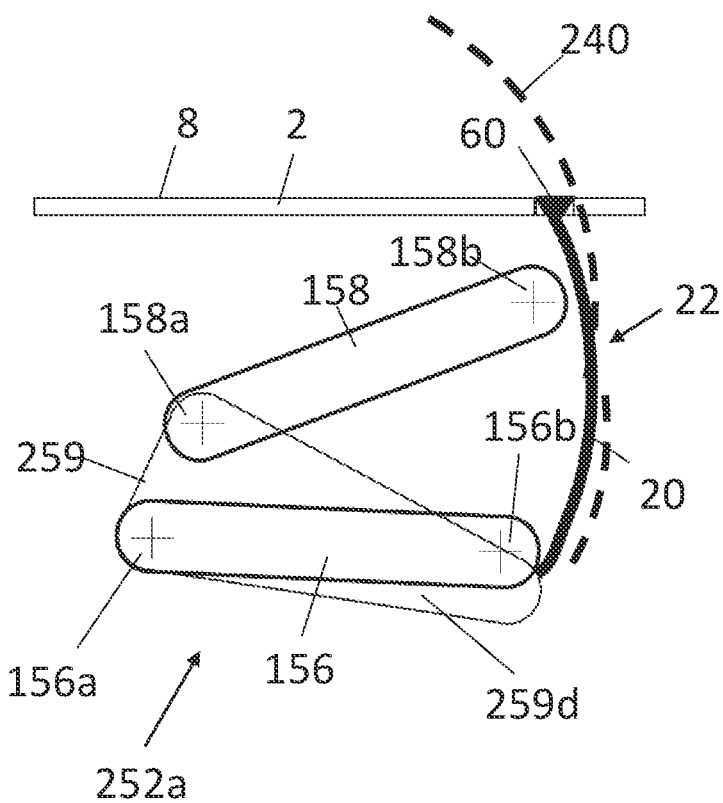
FIGS. 6A to 6C show a cross-sectional view of the aerodynamic control surface and actuating mechanism in the fore-aft direction according to another example of the present invention.
Figure 6B:
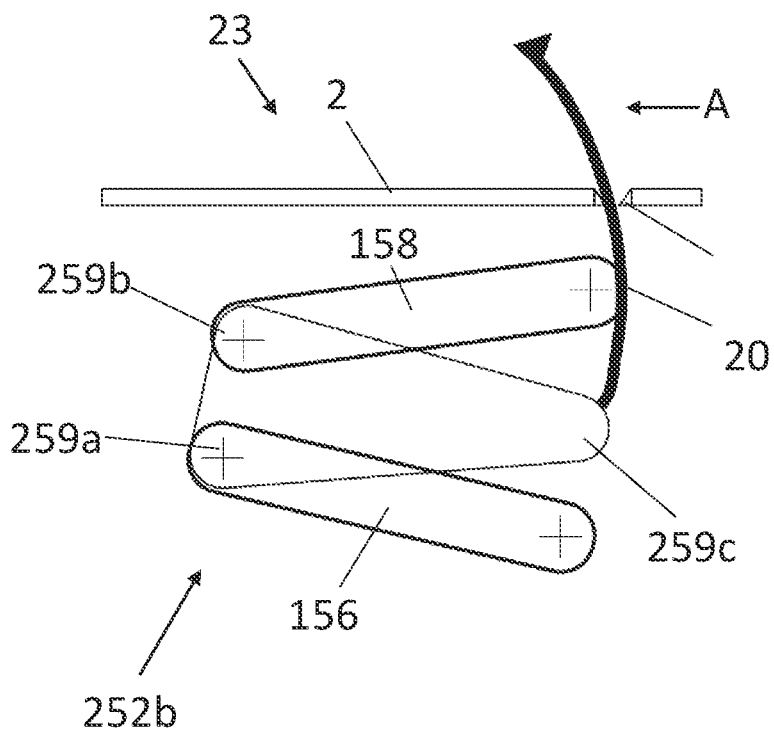
Figure 6C:
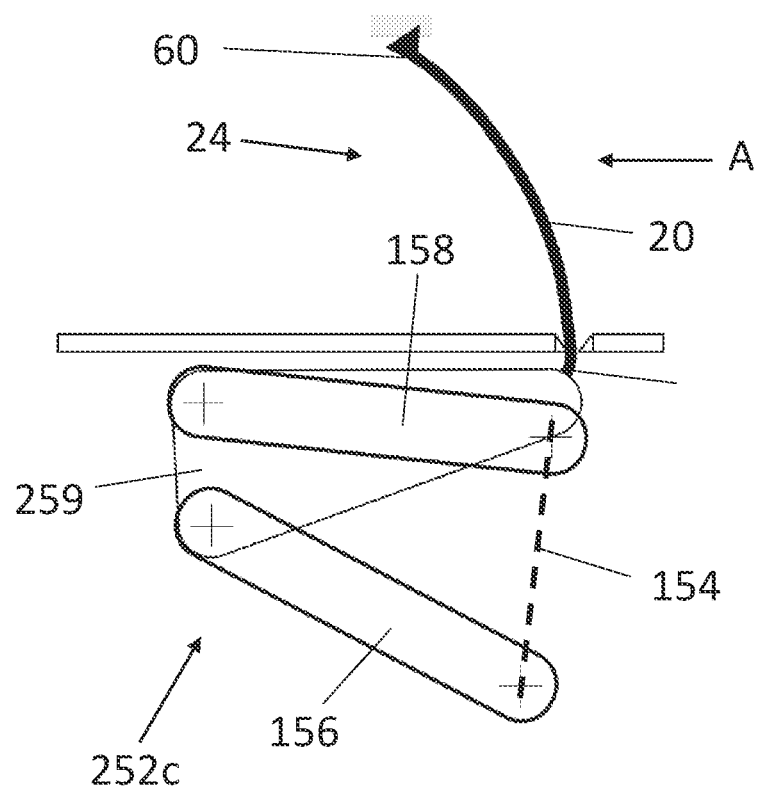

FIGS. 6A-6C show another example of a four-bar link mechanism 252 moving from a first position 252a to a final position 252c. FIG. 6A shows the spoiler 20 in a fully retracted position 22 in the initial position 252a of the third exemplary actuation mechanism 252. Similar to the example in FIGS. 5A-5C, the third exemplary actuation mechanism 252 comprises a four-bar link mechanism 252 with a first crank 156 with a first end 156a and a second end 156b. The four-bar link mechanism 252 also has a second crank 158 with a first end 158a and a second end 158b. The second end of the first crank 156b is pivotally connected to a grounded link 154 at the connection point 156b. Similarly, the second end of the second crank 158b is pivotally connected to the grounded link 154 at the connection point 158b. The grounded link has been omitted from FIGS. 6A- and 6B for clarity but is shown in FIG. 6C.

The first end 156a of the first crank 156 is pivotally coupled to one end 259a of the coupling link 259. Similarly, the first end 158a of the second crank 158 is pivotally coupled to another end 259b of the coupling link 259. The coupling link 259 has an extension 259d which extends away from the pivotal connections (between i. the first end 156a of the first crank 156 and the end 259a of the coupling link and ii. the first end 158a of the second crank 158 and the end 259b of the coupling link 259) towards the grounded link (not shown in FIG. 6A). The extension 259d extends to an apex 259c. In this example, the coupling link 259 and the extension are unitary and form a generally triangular plate. The aerodynamic control surface 20 is rigidly fixed to the coupling link 259 at the apex 259c by the proximal end of the aerodynamic control surface 20a. It will be understood that the coupling link and the extension may take a variety of shapes and need not be triangular, for example, it may be T-shaped with the coupling link forming the top of horizontal top of the T shape and the extension forming the vertical leg of the T shape. The four-bar mechanism 252 with the coupling link 259 having the extension 259d may be a commonly known Roberts mechanism.

The first crank 156 pivots around the grounded link 154 at the connection point 156b and the second crank 158 pivots around the grounded link 154 at the connection point 158b as the four-bar link mechanism moves from the first position 252a to the deployed position 252c.

As shown in FIG. 6A, the aerodynamic control surface 20 is in a retracted state 22 and the four-bar link mechanism 252 is in the first position 252a. In the first position 252a, the aerodynamic control surface 20 does not extend beyond the upper surface 8 of the wing 2. As the four-bar link mechanism 252 moves to the deployed position 252c (where the aerodynamic control surface 20 is in a fully deployed position 24), the first crank 156 and the second crank 158 pivot around the grounded link 154 to extend the aerodynamic control surface 20 through the aperture 18. The movement of the first crank 156 and the second crank 158 moves the coupling link 259 and consequently the aerodynamic control surface 20 along a curved kinematic path 240 (shown in dotted lines). The curved kinematic path 240 has variable radii along the path 240.

FIG. 6C shows the deployed state 24 of the aerodynamic control surface 20 and the third position 252c of the four-bar link mechanism 252. In the third position 252c, the first crank 156 and the second crank 158 rotate around the ground link 154 until the apex of the coupling link 259 is directly below the aperture 18. The aerodynamic control surface 20 extends through the aperture 18 into the oncoming airflow A. As the four-bar link mechanism 252 moves from a first position 252a to the third position 252c, the four-bar link mechanism 252 does not extend through the aperture 18.

The variable radii curved kinematic path 140 of the aerodynamic control surface 20 is defined by the length and arrangement of the first crank 154, the second crank 156 and the shape of the coupling link 259. As such, the curved variable radii kinematic path 140 of the aerodynamic control surface 20 can be tailored, similar to the tailoring of the actuation mechanism 152. The proximity of the aerodynamic control surface 20 or the actuation mechanism 252 to the aerodynamic upper surface 8 can also be altered to tailor the variable radii curved kinematic path 140. The curved profile of the control surface 20 in the height dimension can also be tailored depending on the kinematic path of the actuation mechanism 252, e.g., to minimise the size of the aperture 18.

In the example described in FIGS. 5A-5C, the first crank 156 and second crank 158 are arranged to rotate around the grounded link 154 in the same direction at an approximately equivalent angular rate. That is the say, the second end of the first and second cranks 156b,158b rotate in the same direction with respect to the coupling link 159 as the first crank 156 and the second crank 158 rotate around the grounded link 154. The first crank 156 and second crank 158 are arranged generally parallel to each other in this example in all positions of the actuation mechanism.

In the four-bar linkage of the actuation mechanism 252 shown in the example in FIGS. 6A-6C, whilst the first crank 156 and second crank 158 are arranged to rotate around the grounded link 154 in the same direction, the first and second cranks rotate at different angular rates during the deployment. In this example, the first crank 156 and the second crank 158 are not arranged parallel to each other. Instead, the distance between second end of the first crank 156b and the second end of the second crank 158b is greater than the distance between the first end of the first crank 156a and the first end of the second crank 158a. The end of the coupling link 259 that is pivotally connected at 259a and 259b to the first and second cranks 156, 158 generates a mechanical advantage at the apex 259c so that relatively small angular rotations of the first and second cranks 156, 158 causes a larger movement of the apex 259c of the coupling link 159. Since the control surface 20 is fixed to the apex 259c of the coupling link, the angular deployment of the control surface 20 along the variable radius kinematic path is greater than the angular movement of the first and second cranks 156, 158. The space envelope of the actuation mechanism 252 is therefore comparatively smaller than for the actuation mechanisms 52 and 152.

In addition, since the angular rotation of the coupling link 259 is in the opposite direction to the angular rotation of the first and second cranks 156, 158, the curved profile of the control surface 20 can be convex rather than concave as with the actuation mechanism 152. By way of further explanation it can be seen that the first and second cranks of the actuation mechanism 152 rotate anticlockwise to deploy in the direction of the oncoming airflow A so the flow surface of the control surface 20 is concave to minimise the size of the aperture 18. By contrast the first and second cranks of the actuation mechanism 252 rotate clockwise to deploy in the direction counter to the oncoming airflow A so the flow surface of the control surface 20 is convex to minimise the size of the aperture 18. Of course, it will be appreciated that any of the actuation mechanisms 52, 152, 252 may be oppositely handed to suit either a convex or concave control surface 20.

The actuation mechanism 252 may be actuated by an actuator coupled to either the first or second cranks in a similar manner to that described above for the actuation mechanisms 51, 152.

By deploying the aerodynamic control surface 20 along a curved kinematic path with variable radii, the deployment of the spoiler 20 can be tailored, e.g., to maximise the disruption to the oncoming airflow A. This is because the angle that the aerodynamic control surface 20 makes with the aerodynamic surface 8 at the aperture 18 is constantly changing because of the variable radii. The profile of the aerodynamic control surface 20 has a curvature which may match the path of variable curvature 140, 240 so that the aperture 18 in the wing 2 has a width substantially the same as the maximum thickness T of the aerodynamic control surface 20. Furthermore, the four-bar link mechanism 152, 252 can be used to deploy the spoiler 20 in a smaller space in comparison to the actuator mechanism 52, which needs a larger space to rotate the actuation mechanism 52. Therefore, the four-bar link mechanism arrangement 152, 252 can be utilised in wings with smaller spaces, such as high aspect ratio wings.

The aerodynamic control surface 20 can be actuated by the actuation mechanism 52, 152, 252 anywhere on the wing, such as the leading edge, mid-span, the trailing edge or the wing tip. The aerodynamic control surface 20 may be on arranged on an upper surface 8 or lower aerodynamic surface 9 of the wing 2.

While the above examples have described in detail a single aerodynamic control surface 20 arranged to deploy from the wing 2, it will be understood that multiple aerodynamic control surface 20 may be arranged on the wing 2. Each aerodynamic control surfaces may be actuated simultaneously or independently by an actuation mechanism 52, 152, 252. A plurality of actuation mechanisms may be coupled with each control surface and synchronised in their deployment. One actuator may control movement of several actuation mechanisms, or each actuation mechanism may have a respective actuator. Where a plurality of actuation mechanisms are connected to the same control surface, the type or arrangement of each actuation mechanism may differ, e.g., the number of linkages in each mechanism may be different, or the lengths of the linkages may be different. A linkage arrangement may be provided at each end of the control surface, optionally with one or more further linkages between the end linkages. The linkages may be tuned along the length of the control surface to provide a conical deployment, e.g., for a tapered wing or fuselage.

Whilst in FIG. 3 the control surface 20 is shown having a curved profile in the height dimension (to achieve the concave or convex flow surface) but a linear projection in the length dimension L, the control surface may instead be non-linear in the length dimension L.

Figure 7A:
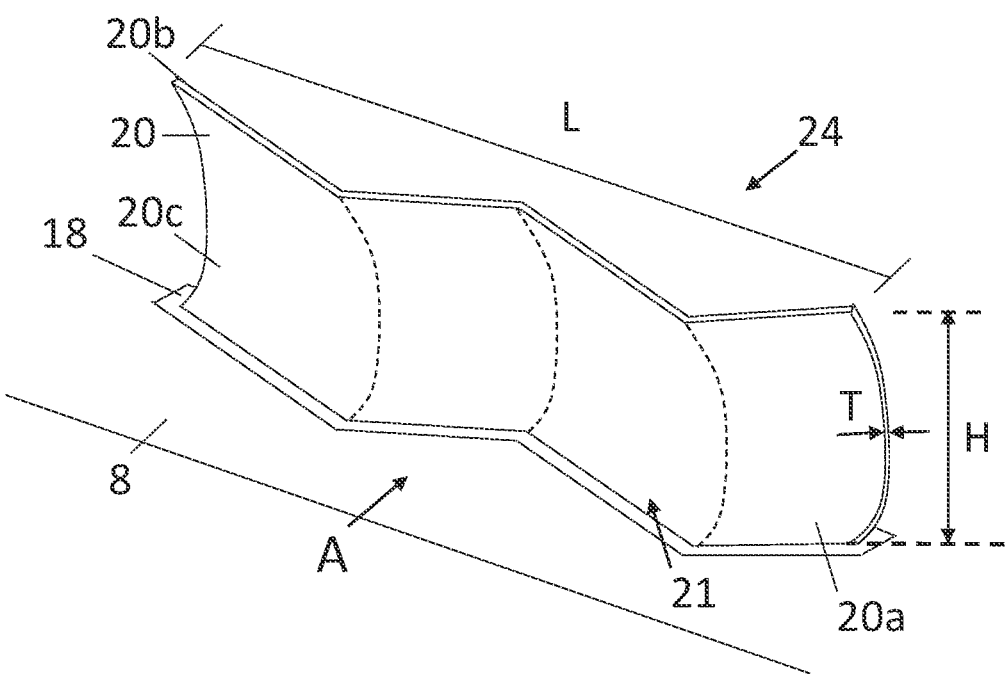
FIG. 7A is a schematic view of a portion of the aircraft wing with a transverse non-linear aerodynamic control surface.
Figure 7B:
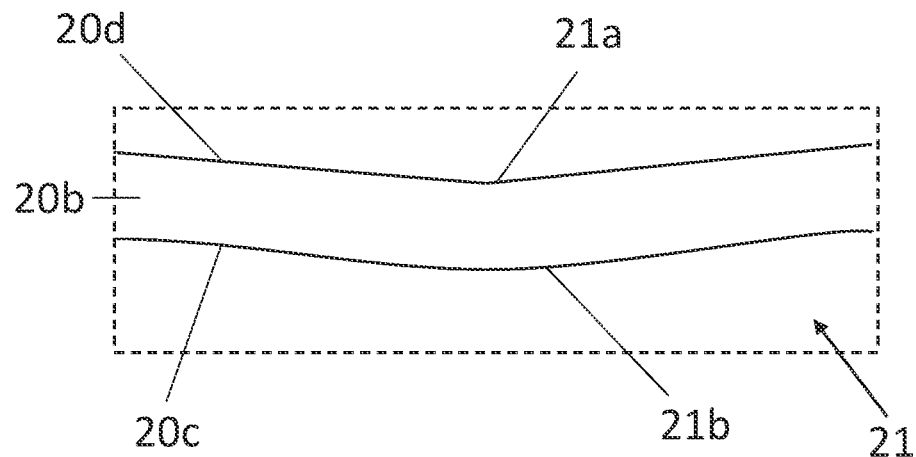
FIG. 7B to 7D show cross-sectional views of various examples of transverse non-linear control surfaces.
Figure 7C:
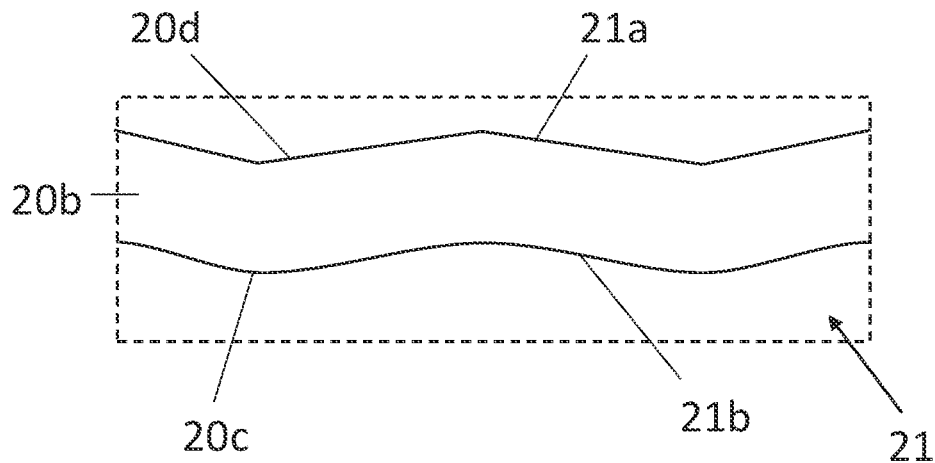
Figure 7D:
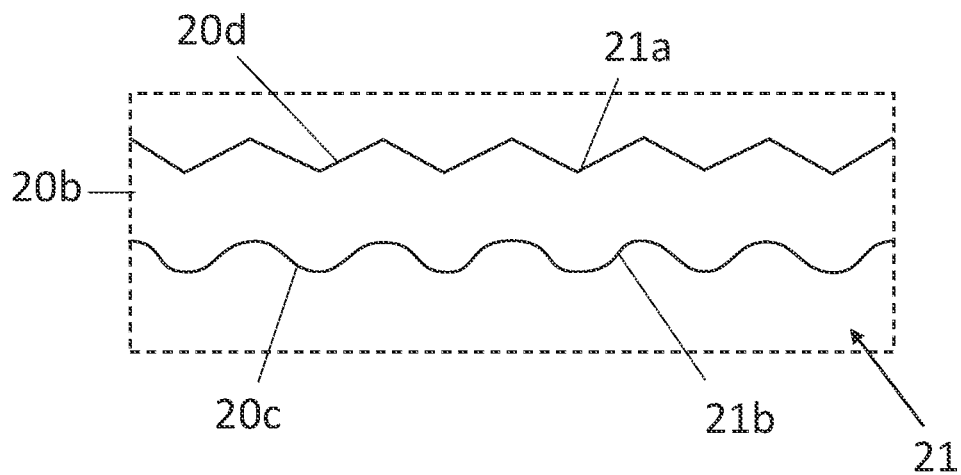

As shown in FIG. 7A, the flow surface 20c and opposing surface 20d may be corrugated in the transverse direction (i.e., the length dimension L of the control surface transverse to the oncoming flow direction A) to create a corrugated profile 21. In all other respects the control surface is the same as that shown in FIG. 3. FIGS. 7B-7D show schematic plan views of the aerodynamic control surface 20 with different transverse profiles 21.

The aerodynamic control surface 20 may have one or more curved corrugations, i.e., a non-linear curvature, and/or may have one or more vertexes along the length L. As shown in FIG. 7B, the aerodynamic control surface 20 may have a corrugated profile achieved by either vertexes 21a or a smooth curvature 21b. The number of corrugations in the aerodynamic control surface 20 may be varied depending on the location of the aerodynamic control surface, length of the aerodynamic control surface and the desired rigidity of the aerodynamic control surface. For example, FIG. 7C shows an aerodynamic control surface 20 with two corrugations (achieved through vertex 21a or smooth curvature 21b), while FIG. 7D shows a corrugated aerodynamic control surface with six vertexes 21a or smooth curvature 21b. It will be understood that any number of vertexes and/or curves (including one, to create a simple concave or convex transverse profile) may be used along the length L of the spoiler 20 to achieve a corrugated profile of the flow surface 20c and opposing surface 20d. The corrugated shape of the aerodynamic control surface 20 provides strength and rigidity to the aerodynamic control surface 20. While the corrugated profile 21 of the aerodynamic control surface 20 has been described in relation to a single aerodynamic control surface 20, it will be understood that multiple aerodynamic control surface 20 may be arranged adjacent along the length of the wing 2. The aerodynamic control surface may be placed adjacent to each other at varying angles and orientations to achieve a corrugated profile along the span of the wing 2.

In the case of a corrugated aerodynamic control surface 20, the length of the linkages of the actuation mechanism 52, 152 or 252 can be tailored depending on which part of the corrugated aerodynamic control surface 20 is rigidly fixed to the coupling link 159, 259 to enable smooth deployment of the aerodynamic control surface from the retracted state 22 to the deployed state 24.

Figure 8A:
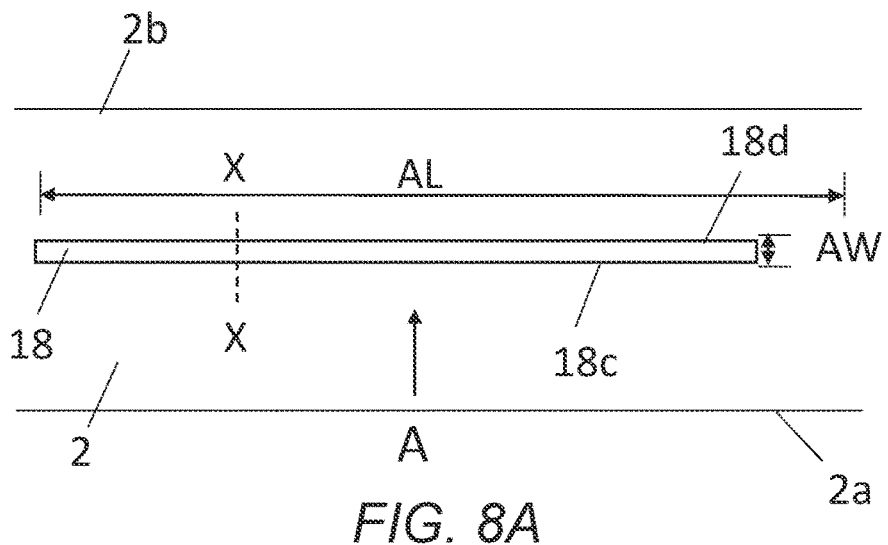
FIGS. 8A and 8B show plan views of the aperture in the aircraft wing.
Figure 8B:
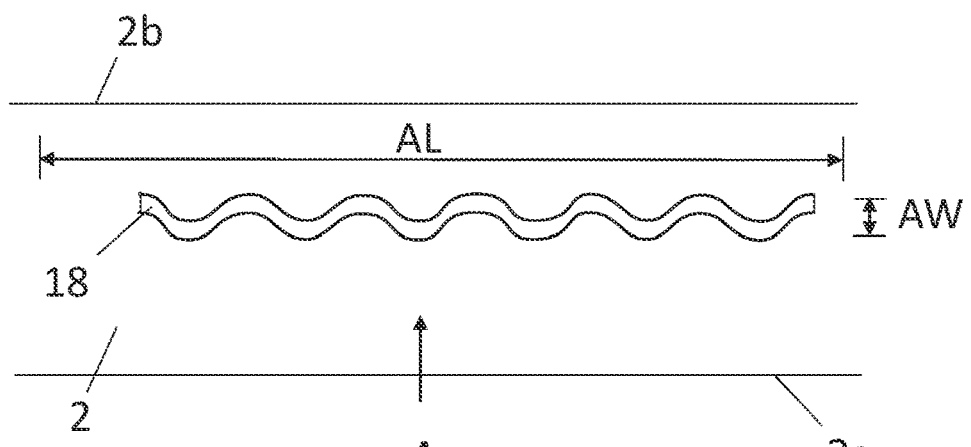

The aerodynamic control surface 20 does not form part of the upper surface 8 of the wing 2. That is to say, the flow surface 20c and opposing surface 20d do not form the upper surface 8, (i.e., the aerodynamic profile) of the wing 2. Instead, the aerodynamic control surface 20 moves from a retracted position 22 to an extended position 24 through an aperture 18 in the upper surface 8 of the wing 2. FIGS. 8A and 8B show a schematic plan view of the aperture 18 in the upper surface 8 of the wing 2.

The aperture 18 has a width AW and a length AL. As the aerodynamic control surface 20 deploys through a curved kinematic path, the size of the aperture 18 matches the maximum thickness of the aerodynamic control surface 20. That is to say, the width AW of the aperture 18 is substantially similar to the maximum thickness T of the aerodynamic control surface 20. As shown in FIG. 8A, the aperture 18 may be slot-shaped, or as shown in FIG. 8B, the aperture 18 may be shaped to match the corrugated profile 21 of the spoiler 20. While the aperture 18 is shown to be serpentine-shaped in FIG. 8B, it will be understood that the aperture 18 may be any suitable shape for a corrugated aerodynamic control surface 20 to extend through.

The actuating mechanisms 52, 152 and 252 enable the aerodynamic control surface 20 to extend through a smaller aperture 18 in comparison to conventional flow control systems. The smaller aperture 18 reduces the drag effects over the upper surface 8 of the wing 2 when the aerodynamic control surface 20 is in the retracted position 22. This is advantageous, as the combined movement of the actuation mechanism 52, 152, 252 and the profile of the aerodynamic control surface 20 results in a 'cleaner' aerofoil profile when the aerodynamic control surface 20 is in the retracted position 22. That is to say, as the spoiler 20 does not form part of the upper surface 8 of the wing 2, the aerodynamic profile of the wing 2 is not altered by any protrusions caused by aerodynamic control surface arranged on the wing 2.

The distal end 20b of the spoiler may also include a seal 60 (shown in FIGS. 5A-5C and 6A-6C). The seal extends along the entire length L of the aerodynamic control surface 20. When the spoiler 20 is in the retracted state 22, the seal 60 sits in the aperture 18 to seal the aperture. The seal 60 is dimensioned to be seated within the aperture 18 to form a smooth aerodynamic profile with the wing 2. That is to say, the seal preferably does not protrude past the upper surface 8 of the wing 2. The seal 60 therefore reduces any unwanted drag effects over the aperture 18. The seal 60 may be made of an elastic material so that the seal 60 can deform to fully be seated in the aperture 18. The seal 60 may any suitable cross-section to seal the aperture, such as a T-shape, top-hat, L-shaped or V-shaped. The seal 60 is secured to the distal end 20b of the aerodynamic control surface by any suitable means, such as adhesive.

In another example, the seal 60 may be made of a rigid material. The rigid seal may be integral with the control surface 20. An elastomeric material may be provided around the aperture 18 when the seal 60 is made of a rigid material. Preferably, the seal is L-shaped or T-shaped such that when the aerodynamic control surface 20 is in the extended position 23, the distal portion of the seal 60 (i.e., furthest from the flow surface) is parallel with the upper surface 8. That is to say, the distal portion of the seal 60 is at right angles (or angled away) from the flow surface. This enables the seal 60 to act as a Gurney flap of the control surface when the control surface is deployed into the airflow. The Gurney flap may add power to the lift spoiling function of the control surface when deployed.

The aerodynamic control surface 20 is preferably a blade. That is to say, the aerodynamic control surface 20 is preferably made of a thin sheet or plate. The aerodynamic control surface 20 may be made of any suitable material, such as a metal, or composite material such as fibre reinforced matrix composite (e.g., carbon fibre reinforced plastic, CFRP). The thickness T of the aerodynamic control surface 20 can be any suitable thickness to withstand the oncoming airflow direction A. The control surface may be tapered with a taper of reducing thickness towards the cantilevered free end furthest from the actuation mechanism. The control surface may be reinforced with stiffeners.

Figure 8C:
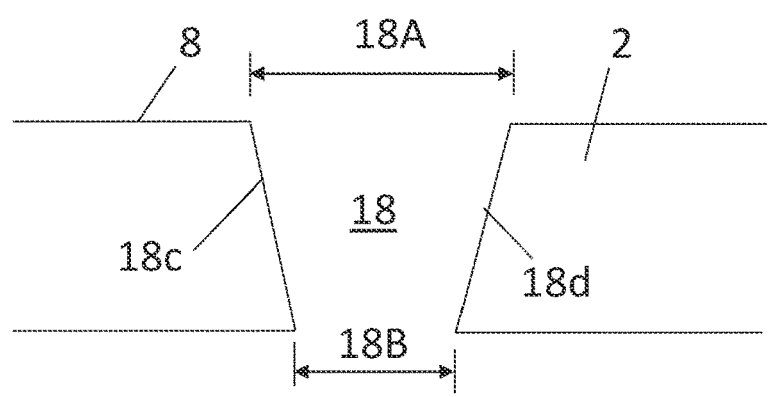
FIG. 8C shows a cross-sectional view in the fore-aft direction of the aperture in the aircraft wing.

FIG. 8C shows a cross-section of the wing 2 along line X-X in FIG. 8A which shows the aperture 18 in greater detail. The aperture 18 in the wing 2 is tapered towards the upper surface 8. The aperture 18 has a first side wall 18c and a second side wall 18d. The first side wall 18c and second side wall 18d may be angled so that the aperture 18 is tapered. Alternatively, the side walls 18c and 18d may be generally parallel or may be curved. The walls of the aperture may be shaped to be just large enough to accommodate the kinematic path of the control surface deployment. In the example shown in FIG. 8A, the aperture 18 is tapered towards the upper surface 8 in the wing 2. The aperture 18 has width 18A at the upper surface 8 that is larger than the width 18B at the opposite end of the aperture 18. As the aerodynamic control surface 20 moves from the retracted position 22 to the deployed position 24, the shape of the aperture 18 matches the curved kinematic path 40, 140, 240 of the aerodynamic control surface to avoid disrupting the path of the aerodynamic control surface 20, and minimises any unnecessary space between the side walls 18c, 18d of the aperture and the path of the spoiler 20. While the side walls 18c and 18d of the aperture 18 is shown to be angled, it will be understood that only one side wall may be angled, or one or both of the side walls may be perpendicular to the surface 8, or that the aperture 18 has a smaller width nearer the upper surface 8 of the wing 2.

The aerodynamic control surface 20 may have a substantially constant thickness along the entire cross-section of the spoiler. Alternatively, the aerodynamic control surface 20 may be thicker at the end nearest the actuation mechanism, and thinner towards the cantilevered free end furthest from the actuation mechanism. The thickness of the aerodynamic control surface 20 can be tailored as required. The width AW of the aperture 18 has a width substantially same as the maximum thickness T of the aerodynamic control surface 20 so that the any gap between the first and second side wall 18c, 18d of the aperture in the upper surface 8 of the wing 2 and the spoiler 20 is reduced as the spoiler 20 moves from the retracted position 22 to the deployed position 24.

Figure 9:
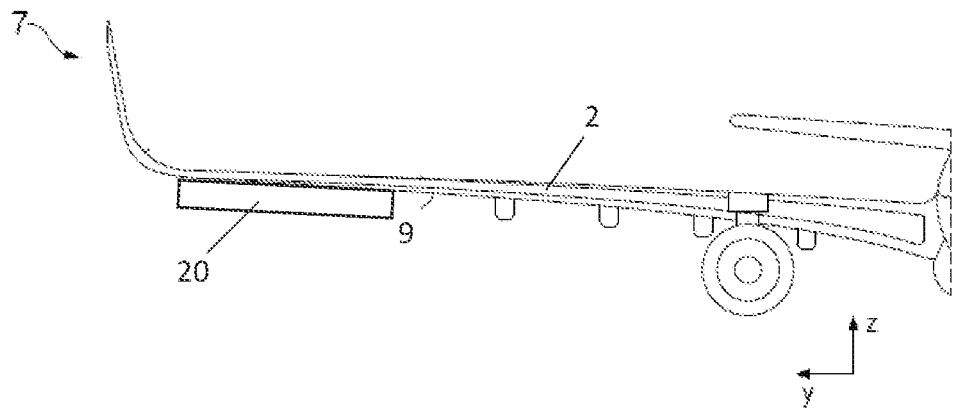
FIG. 9 shows a front view looking aft of the aircraft wing with an aerodynamic control surface with lower wing surface deployment.

The aircraft wing aerodynamic control surface 20 examples described above in detail are designed to provide lift reduction on airflow over the wing, but similar aerodynamic control surface may be attached to the lower aerodynamic surface 9 of the wing, as shown in FIG. 9. The wing 2 may have both upper and lower surface aerodynamic control surface 20.

Figure 10:
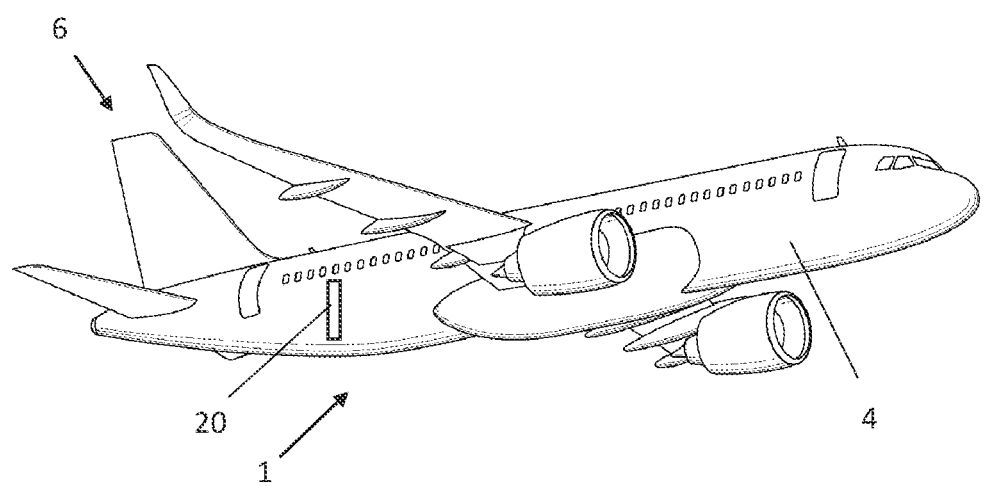
FIG. 10 is an isometric view of an aircraft with an aerodynamic control surfaces on the fuselage.

Similarly, while the examples above are described in relation to a wing lift spoiling device, it will be understood that the aerodynamic control surface 20 may be any other type of device that controls the airflow over an aerodynamic surface, such as a spoileron, lift dumper, air brake of speed brake. As shown in FIG. 10, the aerodynamic control surface 20 may be arranged on the fuselage 4, or any other suitable aerodynamic surface, such as the tail 6.

Whilst the examples above have been described in the context of an aircraft or aircraft, it will be appreciated that all examples of the control surfaces and the actuation mechanisms described may be used in any combination in other industries, e.g., on a wind turbine or a land vehicle, for example.

Where the word or appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An aerodynamic control surface assembly comprising:
a structure with an aerodynamic surface;
a curved aerodynamic control surface configured to move between an extended position and a retracted position;
an actuation mechanism coupled to the aerodynamic control surface and configured to move the aerodynamic control surface between the extended position and the retracted position,
wherein the aerodynamic control surface is arranged to deploy through an aperture in the aerodynamic surface and into an oncoming airflow over the aerodynamic surface when in the extended position and is arranged to retract out of the airflow when in the retracted position,
wherein the actuation mechanism is configured to move the control surface along a curved kinematic path as the control surface moves between the extended position and the retracted position, and wherein the actuation mechanism remains fully behind the aerodynamic surface throughout movement of the aerodynamic control surface between the extended position and the retracted position, wherein the curved kinematic path has variable radii along the length of the curved kinematic path.

2. The aerodynamic control surface assembly according to claim 1, wherein the actuation mechanism comprises a four-bar linkage mechanism.

3. The aerodynamic control surface assembly according to claim 2, wherein the four-bar linkage mechanism comprises:
   a grounded link fixed with respect to the structure;
   a first crank pivotably coupled at one end to the grounded link and pivotably coupled at a second end to a coupling link; and
   a second crank pivotably coupled at one end to the grounded link and pivotably coupled at a second end to the coupling link;
   wherein the aerodynamic control surface is rigidly fixed with respect to either the coupling link or one of the first crank and the second crank.

4. The aerodynamic control surface assembly according to claim 1, wherein the aerodynamic control surface has a flow surface facing the oncoming airflow which is convex or concave.

5. The aerodynamic control surface assembly according to claim 1, wherein the aerodynamic control surface is a blade.

6. The aerodynamic control surface assembly according to claim 5, wherein the blade has a substantially constant thickness or has a taper of reducing thickness towards a cantilevered free end of the blade.

7. The aerodynamic control surface assembly according to claim 1, wherein the aerodynamic control surface is formed as a blade having a thickness, and wherein the profile of the blade has a curvature which substantially matches the path of variable curvature of the actuation mechanism such that the aperture in the aerodynamic surface has a width substantially the same as a maximum thickness of the blade.

8. An aerodynamic control surface assembly comprising:
   a structure with an aerodynamic surface;
   a curved aerodynamic control surface configured to move between an extended position and a retracted position;
   an actuation mechanism coupled to the aerodynamic control surface and configured to move the aerodynamic control surface between the extended position and the retracted position,
   wherein the aerodynamic control surface is arranged to deploy through an aperture in the aerodynamic surface and into an oncoming airflow over the aerodynamic surface when in the extended position and is arranged to retract out of the airflow when in the retracted position,
   wherein the actuation mechanism is configured to move the control surface along a curved kinematic path as the control surface moves between the extended position and the retracted position, and
   wherein the actuation mechanism remains fully behind the aerodynamic surface throughout movement of the aerodynamic control surface between the extended position and the retracted position,
   wherein the aerodynamic control surface is non-linear along the length of the aerodynamic control surface that extends in a spanwise direction of the structure transverse to the oncoming airflow direction.

9. The aerodynamic control surface assembly according to claim 8, wherein the shape of the control surface in the transverse direction is a corrugation.

10. The aerodynamic control surface assembly according to claim 1, wherein the aerodynamic control surface is rigid.

11. The aerodynamic control surface assembly according to claim 1, wherein the aperture in the structure is tapered towards the aerodynamic surface.

12. The aerodynamic control surface assembly according to claim 1, further comprising a seal for sealing the aperture.

13. The aerodynamic control surface assembly according to claim 1, wherein the actuation mechanism further comprises an actuator, preferably a rotary or linear actuator.

14. The aerodynamic control surface assembly according to claim 1, wherein the aerodynamic control surface has a flow surface facing the oncoming airflow, and wherein the flow surface does not form part of the aerodynamic surface of the structure.

15. The aerodynamic control surface assembly according to claim 1, wherein the aerodynamic control surface assembly is part of an aircraft assembly.

16. The aerodynamic control surface assembly according to claim 15, wherein the structure is an aircraft wing and the aerodynamic surface is a surface of the wing.

17. The aerodynamic control surface assembly according to claim 16, wherein the aerodynamic control surface is located on an upper and/or lower aerodynamic surface of the wing.

18. The aerodynamic control surface assembly according to claim 1, wherein the aerodynamic control surface is a spoiler, spoileron, lift dumper, air brake, dive brake or speed brake.

19. A method of controlling airflow over a structure with an aerodynamic surface using a curved aerodynamic control surface, the method comprising:
   actuating an actuation mechanism coupled to the aerodynamic control surface to:
   move the aerodynamic control surface through an aperture in the aerodynamic surface into an oncoming airflow over the aerodynamic surface to place the aerodynamic surface in an extended position, and
   move the aerodynamic control surface through the aperture in the aerodynamic surface into a space behind the aerodynamic surface and out of the airflow to place the aerodynamic surface in a retracted position,
   wherein the actuation mechanism is configured such that the control surface follows a curved kinematic path as the control surface moves between the extended and retracted positions,
   wherein the curved kinematic path has variable radii along the length of the curved kinematic path, and
   wherein the actuation mechanism remains fully behind the aerodynamic surface throughout the movement of the aerodynamic control surface between the extended and retracted positions.

* * * * *